Figure 1:
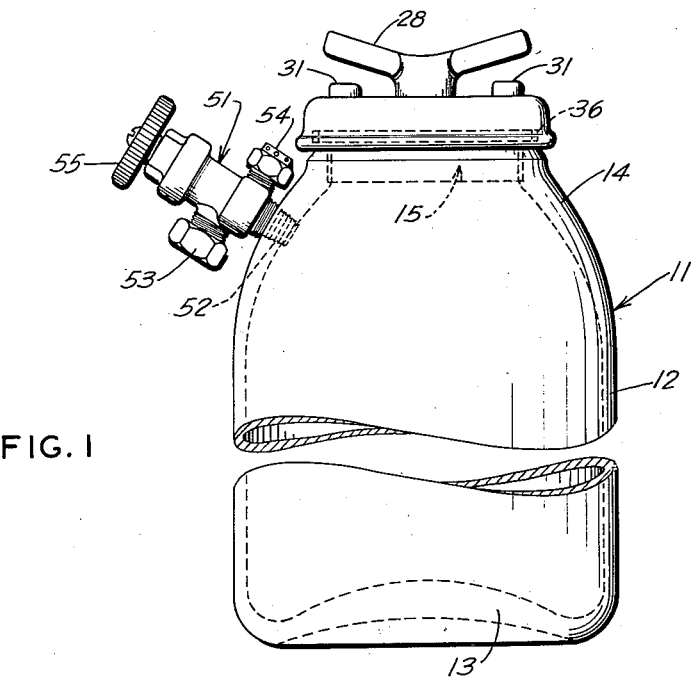

Aug. 22, 1950     R. H. HILL     2,519,572
SEALING CLOSURE MEANS FOR CONVERTERS
Filed July 27, 1946

INVENTOR.
ROBERT H. HILL
BY Wallace and Cannon
ATTORNEYS

Patented Aug. 22, 1950

2,519,572

UNITED STATES PATENT OFFICE 2,519,572

SEALING CLOSURE MEANS FOR CONVERTERS

Robert H. Hill, Elgin, Ill., assignor to The Marison Company, Elgin, Ill., a corporation of Illinois Application July 27, 1946, Serial No. 686,759

3 Claims. (Cl. 220—46)

This invention relates to containers and closures therefor and particularly to pressure containers having closures which render them suitable for use as converters. More particularly, the invention pertains to a pressure vessel having a closure which is gas-tight under high pressure and which is suitable for use in the conversion of a material in one phase to another phase, for example, for the conversion of a solid or a liquid to a gas where high pressures are involved.

The container of the present invention is particularly useful in the conversion of solid carbon dioxide into gas for use in carbonating beverages and similar purposes. Containers of this nature have been utilized heretofore and these, in some instances, have been provided with a relatively large opening to enable solid carbon dioxide to be introduced into the container, such openings having been closed by a lid mounted within the container to be forced into sealing position by the pressure built up in the container upon sublimation of the solid carbon dioxide introduced into the container. In some instances where resort has been had to lids sealed by internal pressure, a gasket has been interposed between the lid and a cooperating surface afforded on the container structure. In the event, however, that the gasket is improperly placed or becomes distorted, leakage past the gasket might occur. If such leakage was not detected prior to the time a relatively high pressure was built up in the container, it has been necessary to waste appreciable gas in order to correct the leaking condition, since, in such circumstances it has been necessary to relieve the pressure in the container, to permit correction of the condition permitting the leakage.

In view of the foregoing and other objections encountered in the use of converters of the aforesaid nature, one of the objects of my invention is to provide a closure for a pressure container or converter that will be of such nature that proper sealing of the gasket may be insured without objectionable loss of gas even in those instances where the gasket is initially misplaced or is otherwise defective.

In other instances, in pressure containers or converters, resort has been had to relatively complicated and expensive closure structures, but in such instances the customary arrangement has been such that the gas under pressure in the container has been directly effective on the gasket or gaskets employed, and in some instances this has resulted in failure of the gasket with a consequent loss of gas. It is therefore yet another object of my invention to provide a relatively inexpensive closure for a container or converter of the aforesaid character and one wherein the gas under pressure in the container cannot be directly effective on the gasket, in such a way as to distort or otherwise damage the gasket so as to impair the sealing function thereof.

Moreover, in those instances where resort has been had to a gasket of natural or synthetic rubber or like material, it has been observed that such gaskets may exhibit swelling or "ballooning" particularly when such gaskets have been so exposed that the relatively high pressure gas sealed thereby in the container can be directly contacted with such gasket. The exact causes of such swelling or "ballooning" are not understood but this is believed to be due to the rubber or material of which the gasket is made occluding the gas. However, it has been observed that whenever a gasket of the aforesaid nature or a considerable area thereof is directly exposed to contact with gas under high pressure, the gasket is usually rendered unfit for reuse. Hence, still another object of this invention is to afford a closure for a pressure container or converter wherein the gasket is so arranged that no appreciable surface area thereof is exposed to the high pressure gas whereby swelling or "ballooning" of the gasket may be avoided.

Yet other objects of this invention are to so arrange a closure of the aforesaid character that the gasket employed therein for sealing purposes may be expeditiously replaced when the need so to do arises; to so arrange the surfaces of the closure adapted to cooperate with the gasket that these surfaces may be readily cleaned in the event, for example, portions of the gasket adhere thereto; and to so arrange a closure of the aforesaid character that the sealing gasket employed therein will be surrounded when installed in sealing position so as to thereby effectively retain the gasket in sealing position.

Yet other objects of this invention are to afford a relatively large opening in a container or converter of the aforesaid character so as to facilitate the introduction thereinto of a material to be converted from one phase to another; to afford a closure for such an opening that may be readily removed therefrom, so as to facilitate cleaning of the interior of the container when the need so to do arises; and to provide a closure for a pressure container or converter that is of simple and economical construction and which will be positive and efficient in use.

Other and further objects of the present invention will be apparent from the following description and claims and are illustrated in the accompanying drawings which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

Figure 2:
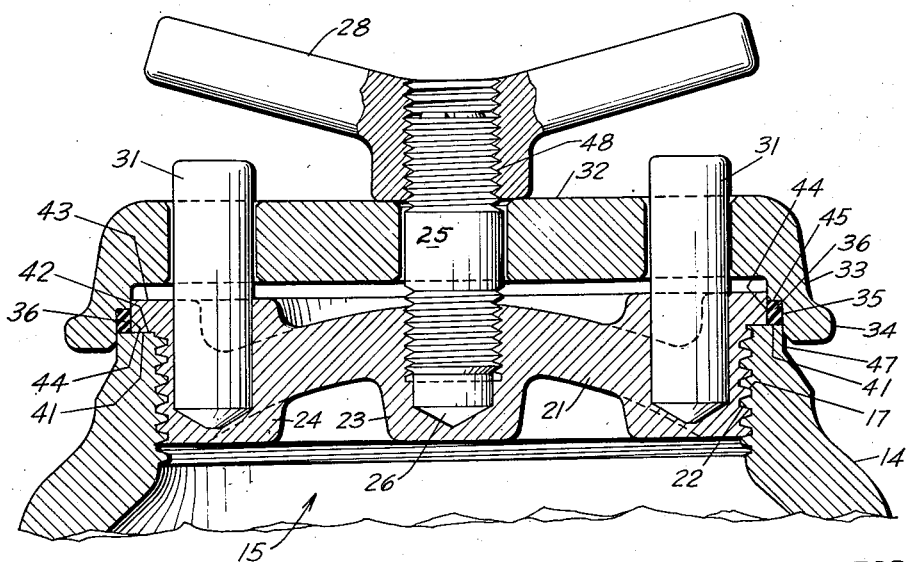

In the drawings,

Fig. 1 is an elevational view, with a part broken away, of a container and closure incorporating my invention; and Fig. 2 is an enlarged vertical sectional detail view showing the upper part of the container with closure and sealing means applied thereto.

The device illustrated in Fig. 1 comprises a substantially cylindrical container of suitable material such as steel of high tensile strength having a wall thickness sufficient to withstand the pressures involved in the handling of gas, such as carbon dioxide, at temperatures which may be encountered in the customary use of such containers. As shown, the container generally indicated by 11 has a cylinder wall portion 12 and an integral bottom 13. Toward the top, as seen in Fig. 1, the cylindrical wall converges as indicated at 14 to terminate in a large opening or mouth indicated generally at 15. The mouth 15 is of a diameter sufficient to permit the convenient insertion into the container of blocks of solid carbon dioxide.

The opening 15 has internal thread elements 17 which are preferably of a coarse and rapid acting type. The thread elements 17 may be either a single or a multiple thread, for example, an acme thread or any coarse free running type of thread, such being desirable because it is advantageous that the closure be quickly removable.

The closure for the opening 15 comprises a convex disc 21 of suitable material such as steel, and of an appropriate strength, provided on its lower outer periphery with thread elements 22 which interfit with the threads 17 in the mouth of the receptacle. The closure disc 21 is provided with a centrally located boss portion 23 and with a peripheral thickened rim portion 24. A stud 25 is fixed, for example, screw threaded, into the opening 26 formed in the central boss 23 and extends upwardly to guide an overlying disc or cover member 32 and to receive a wing nut or hand wheel 28 which is detachably threaded to the upper end of the stud.

A pair of vertically projecting guide pins or studs 31 are secured to the closure disc 21 at diametrically opposed points, these being press fit or otherwise secured in the thickened rim portion 24. The pins 31 project above the upper surface of the closure disc and serve to guide the overlying disc or cover member mentioned above, which is in the form of a plate 32 of suitable metal having a downturned marginal rim 33 terminating in an edge portion 34 which is grooved internally as indicated at 35 to receive a sealing gasket 36 of suitable material. The material for the gasket 36 may be natural rubber, synthetic rubber, or other plastic material having appropriate sealing properties for pressures of the character involved in handling carbon dioxide.

The upper end surface of the container wall surrounding the filling opening is machined, as indicated at 41, to provide a reasonably smooth and true seating surface for a machined flange surface 42 on the under face of a rim element 43 which extends above and outwardly of the thickened rim 24 of the closure disc 21. The surfaces 41 and 42 are sufficiently accurate that a fairly tight seal is obtained when the closure 21 is tightened moderately into the opening through the cooperation of the threads 17 and 22. The outer periphery of the upper flange or rim 43 of closure disc 21 is machined to form another reasonably true surface 44 against which the inner face of the annular gasket 36 may be seated. The upper edge of the gasket 36 fits against another machined surface 45 formed as a shoulder on the underside of the downturned rim 33 of the auxiliary sealing plate 32.

By reference to Fig. 2 it will be seen that the gasket 36 is thus surrounded on all four sides of a section thereof by the machined surfaces 35, 41, 44 and 45 when the parts are assembled as shown in this figure. The surface 35 of the auxiliary cap or plate 32 is machined to fit rather accurately on a cylindrical surface 47 formed at the upper end of the outer wall of the pressure vessel. The central stud 25 and the wing nut or hand wheel 28 are provided with relatively fine screw threads indicated at 48 so that high pressure may be applied to the gasket 36 through the auxiliary sealing disc 32 by manual rotation of the wheel or nut 28. As previously indicated, the main threads 17 and 22, by which the closure disc is secured to the container, are coarse and free running and may be discontinuous or segmental so that the disc 21 can be applied by matching discontinuous parts of the threads on the two elements, inserting the disc 21 practically to its final position, and then rotating it only a fractional turn as will be understood and as is widely practiced in the prior art in connection with the sealing of the ends of various apparatus, especially ordnance material, against high gas pressures. The threads 22 and 17 thus serve to resist the thrust in the end closure against the force of the compressed gas within the vessel whereas the threads 48 are used merely to apply sealing pressure to the gasket. Continuous threads may be preferred, as being less likely to be released accidentally, and hence safer, though not as quickly releasable.

In use, the nut or hand wheel 28 is first released to take the pressure off the auxiliary sealing disc 32 and thereby to free the threads 22 and 17 for easy manual rotation. The disc 21 is then unscrewed, either by turning it only a fraction of a turn and lifting it out when discontinuous threads are used, or by fully unscrewing it where continuous threads are used. The container is then ready for filling.

The opening 15 is large enough, as previously indicated, that pieces or blocks of compressed solid carbon dioxide may be inserted manually or otherwise and after the container is filled, the closure disc 21 is reinserted and tightened. The machined surfaces 41 and 42 although quite accurate are not normally accurate enough to give a gas-tight seal, hence the hand wheel or nut 28 is next tightened to force the auxiliary disc 32 down with respect to the guide studs or pins 31 and thus to compress the gasket 36 against the surface 41 at the top of the pressure vessel. As the hand wheel is tightened, the flange 33 of the upper disc is forced down until the surface 35 surrounds and telescopes, to some extent, the smooth outer surface 47 of the container. The gasket 36 is thus enclosed on all four sides, looking at a cross section of the gasket, and there is no substantial surface area of the gasket which is exposed to any gases which may leak between the surfaces 41 and 42.

As a result of the construction just described, the gasket 36 cannot swell materially in use. Presumably this is because no substantial surface is free to absorb large quantities of gas which, when pressure is released, will cause the gasket to "balloon" or swell excessively thus making subsequent reuse impossible.

In case, however, that the gasket 36 should eventually become damaged and require replacement, it is easily removed by unscrewing the hand wheel 38 and separating the disc 32 from the main closure disc 21. The gasket then is fully exposed and any parts which adhere to the closure discs or to the surface 41 of the pressure vessel may be readily removed and the surface cleaned for a new gasket.

A suitable valve 51 is threaded, as at 52, into the container near the upper end thereof, as shown in Fig. 1. This valve may be provided with appropriate fittings as 53 and 54 for purposes well understood in the art. This valve also includes the usual operating handle or hand wheel 55. The fitting as 54 is desirably of such nature that a conduit or the like may be connected thereto so as to enable gas contained within the converter to be directed to a point of use, the valve 51 enabling the gas supplied to such a conduit to be shut off when so desired.

When a container of the above described character is to be used as a carbon dioxide converter, the closure arrangement described above is removed and solid carbon dioxide is introduced through the relatively large opening 15. Thereafter, the main closure disc 21 is threaded into position to bring the surfaces 41 and 42 into contact, and a gasket as 36 is disposed in engagement with the surfaces 41 and 44. The cover 32 is then arranged on the studs 31 and the hand wheel or wing nut 28 is manipulated to force the surfaces 35 and 45 on this cover plate into engagement with the gasket 36 in such a way as to apply sufficient pressure on the gasket as to prevent escape of gas from within the container.

Once the supply of gas from the container is exhausted and it is desired to recharge the container, the hand wheel or wing nut is manipulated so as to enable detachment of the cover 32 and thereafter the disc 21 is removed. At this time the interior of the container may be conveniently cleaned by reason of the relatively large opening 15. Once it is desired to again use the container as a converter, solid carbon dioxide or the like is introduced into the container and thereafter the closure structure is replaced in the manner described hereinabove.

It will be manifest that since the gasket as 36 is enclosed by the surfaces 41 and 44, 45 and 35 when the closure is arranged to seal the container, no appreciable surface area of the gasket is exposed to the gas pressure and as a result of this it has been observed that very little, if any, gas is occluded in the gasket. In any event, when it becomes necessary to replace the gasket 36 this may be conveniently done since the gasket is fully exposed once the cover 32 is removed, and when the cover 32 is removed and the gasket 36 has been removed, all surfaces with which the gasket is to cooperate are exposed and may be cleaned so as to insure proper cooperation of these surfaces and the gasket so as to thereby insure effective sealing of the converter.

Hence, it will be seen that a converter embodying a closure of the above described nature enables the hereinabove set forth kindred objects of this invention to be realized. However, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. In a pressure vessel adapted to contain gas under high pressure, a filling neck for the vessel having an axial filling opening therein and terminating in a flat annular sealing face bordering said opening and disposed normal to the axis of said neck, said neck having a cylindrical outer guide surface adjacent to and defining the outer edge of said flat annular sealing face, said neck having axially related internal thread elements formed therein, a closure for said opening having an externally threaded portion complemental to said thread elements of said neck and having an upper annular sealing flange adapted to be drawn downwardly by cooperation of said threads into sealing relation with respect to an inner annular portion of said flat sealing face, said flange terminating in a cylindrical outer guiding edge concentric with the axis of said screw threads, a centrally apertured cap plate having a downwardly extended annular flange slidably engaging said cylindrical outer guiding surface of said sealing flange, said downwardly extended flange having an annular rabbeted groove along its lower inner edge adapted to engage and be guided along said cylindrical outer guide surface of said neck, a compressible annular sealing ring disposed in said rabbeted groove and engaging said cylindrical outer guiding edge of said sealing flange and an outer annular area of said flat sealing face of said neck so as to be enclosed in a compressible sealing relation by such edge, such outer annular area of said face and such rabbeted groove, a threaded clamping stud fixed to and projecting axially upwardly from said closure member and through the central aperture of said cap plate, a clamping nut on the end of said stud for holding said cap plate in position on said stud and for applying clamping pressure to said cap plate, and guide means acting between said closure member and said cap plate to hold the same against relative rotation about the axis of said stud.

2. In a pressure vessel adapted to contain gas under high pressure, a filling neck having an axial filling opening therein and terminating in a flat annular sealing face bordering said opening and disposed normal to the axis of said neck, said neck having a cylindrical outer guide surface adjacent to and defining the outer edge of said flat annular sealing face, said neck having axially related internal thread elements formed therein, a closure for said opening having an externally threaded portion complemental to said thread elements of said neck and having an upper annular sealing flange adapted to be drawn by cooperation of said threads into sealing relation with respect to an inner annular area of said flat sealing face, said flange terminating in a cylindrical outer guiding edge concentric with the axis of said screw threads, a centrally apertured cap plate having a downwardly extended annular flange slidably engaging said cylindrical guiding surface of said sealing flange, said downwardly extended flange having an annular rabbeted groove along its lower inner edge and adapted to engage and be guided along said outer cylindrical surface of said neck, a compressible annular sealing ring disposed in said rabbeted groove and engaging said outer cylindrical guiding edge of said sealing flange and also engaging an outer annular area of said flat sealing face so as to be enclosed in a compressible sealing relation by such edge, said outer annular area of said face and such rabbeted groove, and means acting between said closure member and said cap plate for applying clamping pressure to said cap plate to compress said annular sealing ring.

3. In a pressure vessel adapted to contain gas under high pressure, a filling neck having an axial filling opening therein and terminating in a flat annular sealing face bordering said opening and disposed normal to the axis of said neck, said neck having a cylindrical outer guide surface adjacent to and defining the outer edge of said flat annular sealing face, said neck having axially related internal thread elements formed therein, a closure for said opening having an externally threaded portion complemental to said thread elements of said neck and having an upper annular sealing flange adapted to be drawn by cooperation of said threads into sealing relation with respect to an inner annular portion of said flat sealing face, said flange terminating in a cylindrical outer guiding edge concentric with the axis of said screw threads, a centrally apertured cap plate having a downwardly extended annular flange slidably engaging said cylindrical guiding surface of said sealing flange, said downwardly extended flange having an annular rabbeted groove along its inner edge and adapted to engage and be guided along said outer cylindrical surface of said neck to afford an annular gasket-receiving chamber defined by said edge of said sealing flange, said rabbeted groove and an outer annular area of said flat sealing face, a compressible annular gasket disposed in said annular gasket-receiving chamber, and clamping means acting between said closure member and said cap plate for applying clamping pressure to said cap plate and thereby compress said gasket in a fully enclosed and confined relation within such chamber.

ROBERT H. HILL.

REFERENCES CITED

The following references are of record in the file of this patent:

UNITED STATES PATENTS

| Number | Name | Date |
|---|---|---|
| 1,617,451 | Kniskern | Feb. 15, 1927 |
| 1,961,298 | Lundy | June 5, 1934 |
| 1,992,633 | Price | Feb. 26, 1935 |
| 2,120,057 | Merrill | June 7, 1938 |
| 2,166,637 | McIlrath | July 18, 1939 |

FOREIGN PATENTS

| Number | Country | Date |
|---|---|---|
| 78,514 | Germany | Mar. 15, 1919 |
| 294,756 | Great Britain | Aug. 2, 1928 |
| 369,699 | France | Jan. 17, 1907 |